United States Patent
Kumar

(10) Patent No.: US 10,198,060 B2
(45) Date of Patent: *Feb. 5, 2019

(54) CONTROLLING POWER MANAGEMENT IN MICRO-SERVER CORES AND PERIPHERALS

(71) Applicant: Intel Corporation, Santa Clara, CA (US)

(72) Inventor: Anil K. Kumar, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 79 days.

This patent is subject to a terminal disclaimer.

(21) Appl. No.: 15/194,076

(22) Filed: Jun. 27, 2016

(65) Prior Publication Data

US 2016/0306411 A1    Oct. 20, 2016

Related U.S. Application Data

(63) Continuation of application No. 13/997,874, filed as application No. PCT/US2012/031760 on Mar. 31, 2012, now Pat. No. 9,454,210.

(51) Int. Cl.
*G06F 1/00* (2006.01)

(52) U.S. Cl.
CPC ............ *G06F 1/3215* (2013.01); *G06F 1/325* (2013.01); *G06F 1/3206* (2013.01); *G06F 1/3234* (2013.01)

(58) Field of Classification Search
CPC .... G06F 1/3203; G06F 1/3206; G06F 1/3234; G06F 1/325

(Continued)

(56) References Cited

U.S. PATENT DOCUMENTS

| 8,613,658 B2 | 12/2013 | Amaitis et al. |
| 2003/0070013 A1 | 4/2003 | Hansson |

(Continued)

FOREIGN PATENT DOCUMENTS

| CN | 101356510 A | 1/2009 |
| CN | 101458558 A | 6/2009 |

(Continued)

OTHER PUBLICATIONS

Office Action for Taiwanese Patent Application No. 102108647, dated Aug. 26, 2015, 8 pages including 4 pages of English translation.

(Continued)

*Primary Examiner* — Aurel Prifti
(74) *Attorney, Agent, or Firm* — Jordan IP Law, LLC

(57) ABSTRACT

Systems and methods of enabling power management in a micro server include providing multiple cores, a power management module coupled to the cores, and one or more peripherals coupled to the power management module. The power management module may be configured to cause the one or more peripherals to delay operations based on determining that the cores are in a first power consumption state, and place the cores in a second power consumption state for a predetermined time period. The second power consumption state may consume less power than the first power consumption state. The power management module may cause the one or more peripherals to resume their operations based on expiration of the predetermined time period and may place the cores in a third power consumption state based on the expiration of the time period.

18 Claims, 5 Drawing Sheets

(58) Field of Classification Search
USPC ........ 713/323, 300, 320, 324, 228; 712/220; 714/4.11
See application file for complete search history.

(56) References Cited

U.S. PATENT DOCUMENTS

| | | | |
|---|---|---|---|
| 2005/0289368 A1* | 12/2005 | Chang | G06F 1/3268 713/300 |
| 2006/0053326 A1* | 3/2006 | Naveh | G06F 1/3203 713/323 |
| 2007/0055852 A1* | 3/2007 | Hanes | G06F 9/3851 712/228 |
| 2007/0101173 A1* | 5/2007 | Fung | G06F 1/3209 713/300 |
| 2008/0162982 A1 | 7/2008 | Li et al. | |
| 2008/0244287 A1 | 10/2008 | Kwa et al. | |
| 2009/0150696 A1 | 6/2009 | Song et al. | |
| 2010/0037038 A1* | 2/2010 | Bieswanger | G06F 1/3203 712/220 |
| 2010/0058078 A1* | 3/2010 | Branover | G06F 1/3203 713/300 |
| 2010/0082866 A1 | 4/2010 | White et al. | |
| 2010/0287394 A1 | 11/2010 | Branover et al. | |
| 2010/0293401 A1 | 11/2010 | de Cesare et al. | |
| 2010/0299541 A1 | 11/2010 | Ishikawa et al. | |
| 2011/0035611 A1* | 2/2011 | Brey | G06F 1/3203 713/320 |
| 2011/0087913 A1* | 4/2011 | Robles | G06F 1/3215 713/330 |
| 2011/0145617 A1* | 6/2011 | Thomson | G06F 1/3203 713/323 |
| 2011/0258469 A1 | 10/2011 | Guan et al. | |
| 2011/0296222 A1* | 12/2011 | Tan | G06F 1/3203 713/324 |
| 2012/0151248 A1* | 6/2012 | Bower, III | G06F 1/30 714/4.11 |
| 2014/0181555 A1* | 6/2014 | Bodas | G06F 9/4812 713/323 |

FOREIGN PATENT DOCUMENTS

| | | |
|---|---|---|
| TW | 594466 B | 6/2004 |
| TW | 200509594 A | 3/2005 |
| TW | 201025020 A1 | 7/2010 |

OTHER PUBLICATIONS

Office Action for Chinese Patent Application No. 201280072110.8, dated Dec. 9, 2016, 25 pages including 10 pages of English translation.
Office Action and Search Report for Chinese Patent Application No. 201280072110.8, dated Mar. 30, 2016, 47 pages including 32 pages of English translation.
Office Action and Search Report for Taiwanese Patent Application No. 102108647, dated Dec. 25, 2014, 19 pages including 9 pages of English translation.
International Preliminary Report on Patentability received for PCT Patent Application No. PCT/US2012/031760, dated Oct. 9, 2014, 6 pages.
International Search Report and Written Opinion received for PCT Patent Application No. PCT/US2012/031760, dated Nov. 23, 2012, 9 pages.
Non-Final Office Action for U.S. Appl. No. 13/997,874, dated Jan. 5, 2016, 23 pages, United States Patent and Trademark Office.
Notice of Allowance for U.S. Appl. No. 13/997,874, dated Jun. 1, 2016, 16 pages, United States Patent and Trademark Office.
2nd Office Action for CN Application No. 201280072110.8 dated Oct. 11, 2017, 7 pages, including 4 pages of English translation.

* cited by examiner

CONTROLLING POWER MANAGEMENT IN MICRO-SERVER CORES AND PERIPHERALS

CROSS-REFERENCE TO RELATED APPLICATIONS

The present application is a continuation of U.S. National Phase patent application Ser. No. 13/997,874 filed on Apr. 23, 2014, which claims benefit to International Patent Application No. PCT/US2012/031760 filed on Mar. 31, 2012.

BACKGROUND

Uncoordinated activities among many components associated with micro servers may lead to low utilization of resources. Current solutions are either not very sensitive to workload or put heavy burden on the vendors of the components.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
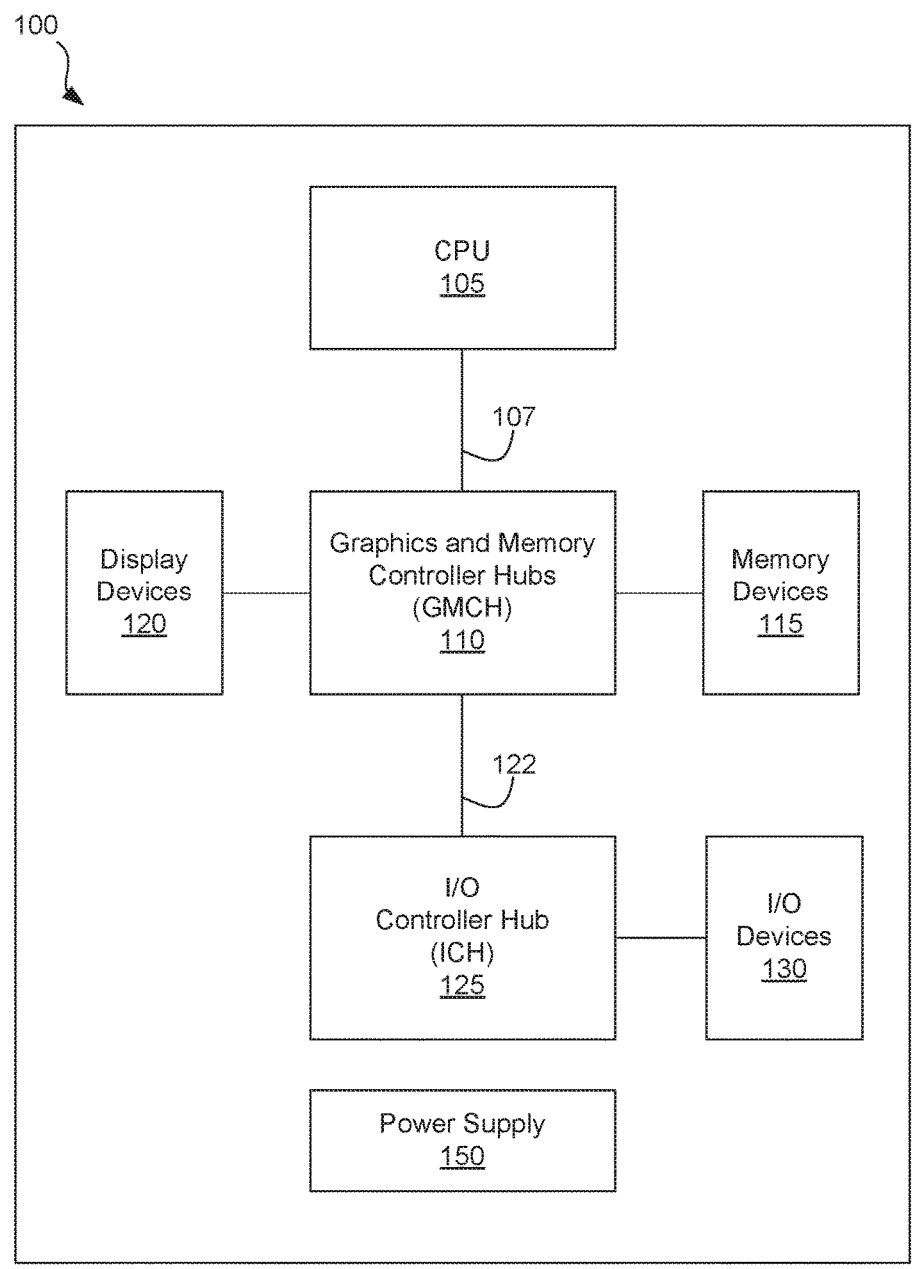
FIG. 1 is a block diagram that illustrates an example computer system, in accordance with some embodiments.

Embodiments may involve an apparatus that includes logic to transmit a first notification to one or more peripherals using side band messages to cause the one or more peripherals to delay operations. The first notification may be transmitted based on cores of a micro server being placed into a first power consumption state.
The apparatus may include logic to place the cores into a second power consumption state that is to consume less power than the first power consumption state. The apparatus may also include logic to start a timer for a time period. The cores may be configured to stay in the second power consumption state for the time period. At least one of the one or more peripherals is configured to buffer data during the time period. The apparatus may further include logic to transmit a second notification to the one or more peripherals using the side band messages. The second notification may notify that the cores of the micro server are being placed into a third power consumption state upon expiration of the time period. The third power consumption state may consume more power than the first and second power consumption states.

Embodiments may involve a system which may include having multiple cores, a power management module coupled to the cores, and one or more peripherals coupled to the power management module. The power management module may be configured to cause the one or more peripherals to delay operations based on determining that the cores are in a first power consumption state. The power management module may place the cores in a second power consumption state for a predetermined time period. The second power consumption state may consume less power than the first power consumption state. The power management module may cause the one or more peripherals to resume their operations based on expiration of the predetermined time period and may place the cores in a third power consumption state based on the expiration of the time period. The third power consumption state may consume more power than the first power consumption state and the second power consumption state.

Embodiments may involve a computer-implemented method which may include using side band communication to cause one or more peripherals of a server having multiple cores to delay operations based on determining that the cores are being placed into a first power consumption state. The method may include placing the cores into a second power consumption state for a time period. The second power consumption state may consume less power than the first power consumption state.
Using the side band communication, the method may cause the one or more peripherals to resume operations based on expiration of the time period. The method may further include placing the cores into a third power consumption state based on the expiration of the time period. The third power consumption state may consume more power than the first power consumption state and the second power consumption state.

Turning to FIG. 1, a block diagram that illustrates an example computer system 100 is shown, in accordance with some embodiments. The computer system 100 may include a central processing unit (CPU) 105, a graphics and memory controller hub (GMCH) 110, and an input/output controller hub (ICH) 125. The GMCH 110 may be coupled to the CPU 105 via a bus 107. The ICH 125 may be coupled to the GMCH 110 via a bus 122. The GMCH 110 may also be coupled to memory devices 115 and display devices 120. The ICH 125 may be coupled to I/O devices 130. The GMCH 110 may include a graphics system (not shown). Although the CPU 105, the GMCH 110 and the ICH 125 are illustrated as separate components, the functions of two or more of these components may be combined. A power supply 150 may be used to provide power to the computer system 100. The power supply 150 may be a battery or an external power source.

For some embodiments, the CPU 105 may be a multi-core processor. The computer system 100 may also include many other components; however, for simplicity, they are not shown. For some embodiments, the computer system 100 may be a server computer system.

Figure 2:
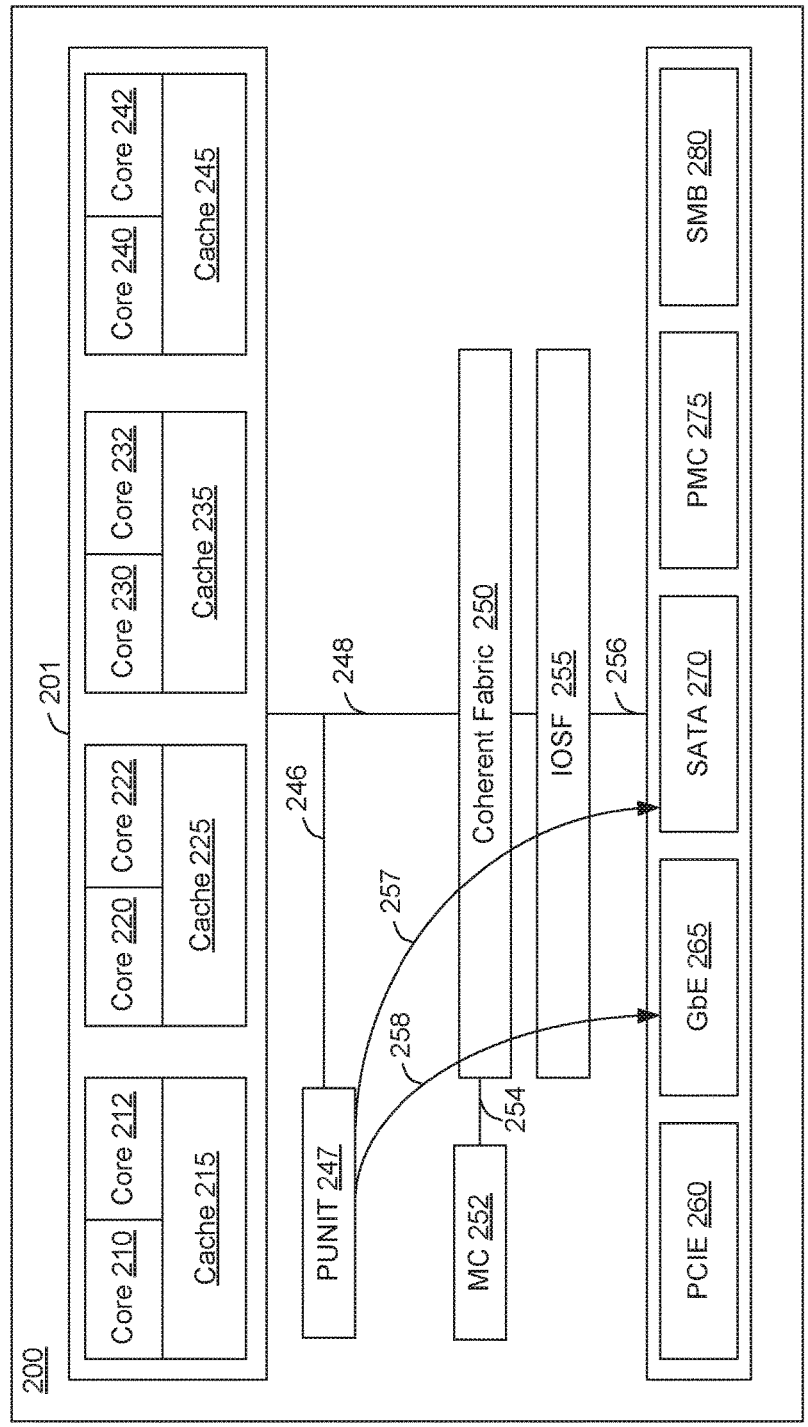
FIG. 2 is a block diagram that illustrates an example of a socket or a micro server, in accordance with some embodiments.

Turning to FIG. 2, a block diagram that illustrates an example socket having multiple cores is shown, in accordance with some embodiments. The socket 200 may include four modules. Each module may include two cores sharing the same cache. In the current example, there are eight cores in the socket 200, wherein the cores 210, 212 share the cache 215, the cores 220, 222 share the cache 225, the cores 230, 232 share the cache 235, and the cores 240, 242 share the cache 245. The eight cores may be collectively referred to as the cores 201.

The socket 200 may be implemented as a system on a chip (SoC) which may integrate many hardware components of a computer system into a single chip. These components may include processing logic (e.g., cores), memory controller and associated memories, peripherals, interfaces, etc. The socket 200 may include software (e.g., drivers, operating system, etc.) that may be used to enable the socket 200 to operate with the integrated hardware.

The socket 200 may include a coherent fabric 250 and an input/output scalable fabric (IOSF) 255. The coherent fabric 250 may be coupled with the cores and the cache via communication line 248. The coherent fabric 250 may also be coupled with a memory controller (MC) 252 via communication line 254. The socket 200 may also include a set of peripherals including, for example, Peripheral Component Interconnect Express (PCIE) controller 260, Gigabit Ethernet (GbE) controller 265, Serial Advanced Technology Attachment (SATA) controller 270, power management controller (PMC) 275 and system memory bus (SMB) 280.

The coherent fabric 250 and the IOSF 255 may be configured to direct traffic within the socket 200 between the cores 201 and the set of peripheral devices via communication lines 248 and 256. The GbE controller 265 may be configured to handle transmitting and receiving network traffic between a network and the cores 201. For the example, when a packet arrives from a network, the GbE controller 265 may transmit the packet to the coherent fabric 250. The coherent fabric 250 may then forward the packet to the appropriate core of the cores 201 for processing. The SATA controller 270 may be configured to handle requests for SATA connected devices (e.g., hard disk storage). The PCIE controller 260 may be configured to handle requests for PCIE connected devices. The PMC 275 may be configured to handle power management for the socket. The SMB 280 may be configured to handle traffic between the socket 200 and another socket (shown in FIG. 3).

In general, when the cores 201 are not fully utilized, they may be placed into a low power consumption state. To be efficient, the cores 201 should stay in the low power consumption state for at least some minimum period of time. This is because it may take time for the cores 201 to transition from a normal power consumption state to a low power consumption state. It may also take time for the cores 201 to return from the low power consumption state to the normal power consumption state. If after the cores 201 are placed into the low power consumption state, and the cores 201 are woken up too early, the overall power consumption of the cores 201 may end up to be more than if the cores 201 are kept in the normal power consumption state the entire time. For example, while the cores 201 are in a low power consumption state, a packet may arrive and be received by the GbE controller 265. The GbE controller 265 may cause the cores 201 to wake up to process the packet regardless of how long the cores 201 may have been in the low power consumption state. Similarly, when the SATA controller 270 receives data from a hard disk device (as a result of a previous read request), the SATA controller 270 may cause the cores 201 to wake up even though the cores 201 may have just completed entering the low power consumption state. Since the peripheral devices such as the GbE controller 265 or the SATA controller 270 may wake up the cores 201 at any time, it may be difficult to predict how long the cores 201 may stay in the low power consumption state. Thus, even when the utilization of the cores 201 may be low (e.g., less than 30%), it may be not energy efficient to place the cores 201 into the low power consumption state because one or more of the peripheral devices may wake up the cores too soon.

There may be multiple different power consumption states in which the cores 201 may be placed. For example, the cores 201 may be placed in an "MC0" state, which may correspond to a normal power consumption state. The cores 201 may be placed in an "MC4" state, which may correspond to a low power consumption state. The cores 201 may also be placed in an "MC6" state which may correspond to an even lower power consumption state. The MC6 state may be considered a sleep state relative to the MC0 and the MC4 state. For some embodiments, a power management unit (PUNIT) 247 may be configured to monitor the utilization of the cores 201. The PUNIT 247 may be coupled with the cores 201 and the coherent fabric 250. The PUNIT 247 may be configured to provide power management for the cores 201. For example, the PUNIT 247 may monitor the utilization of the cores 201 and may determine when to place the cores 201 into the low power consumption state (e.g., from MC0 state to MC4 state). The PUNIT 247 may communicate with the cores 201 and the coherent fabric 250 via a communication line 246. For some embodiments, the PUNIT 247 may be configured to notify the peripheral devices when the cores 201 may be placed into an even lower power consumption state (e.g., from MC4 state to MC6 state), and when the cores 201 may be placed into the normal power consumption state (e.g., from MC6 state to MC0 state). For some embodiments, the PUNIT 247 may use a side band 257 to notify the SATA controller 270 and a side band 258 to notify the GbE controller 265.

Figure 3:
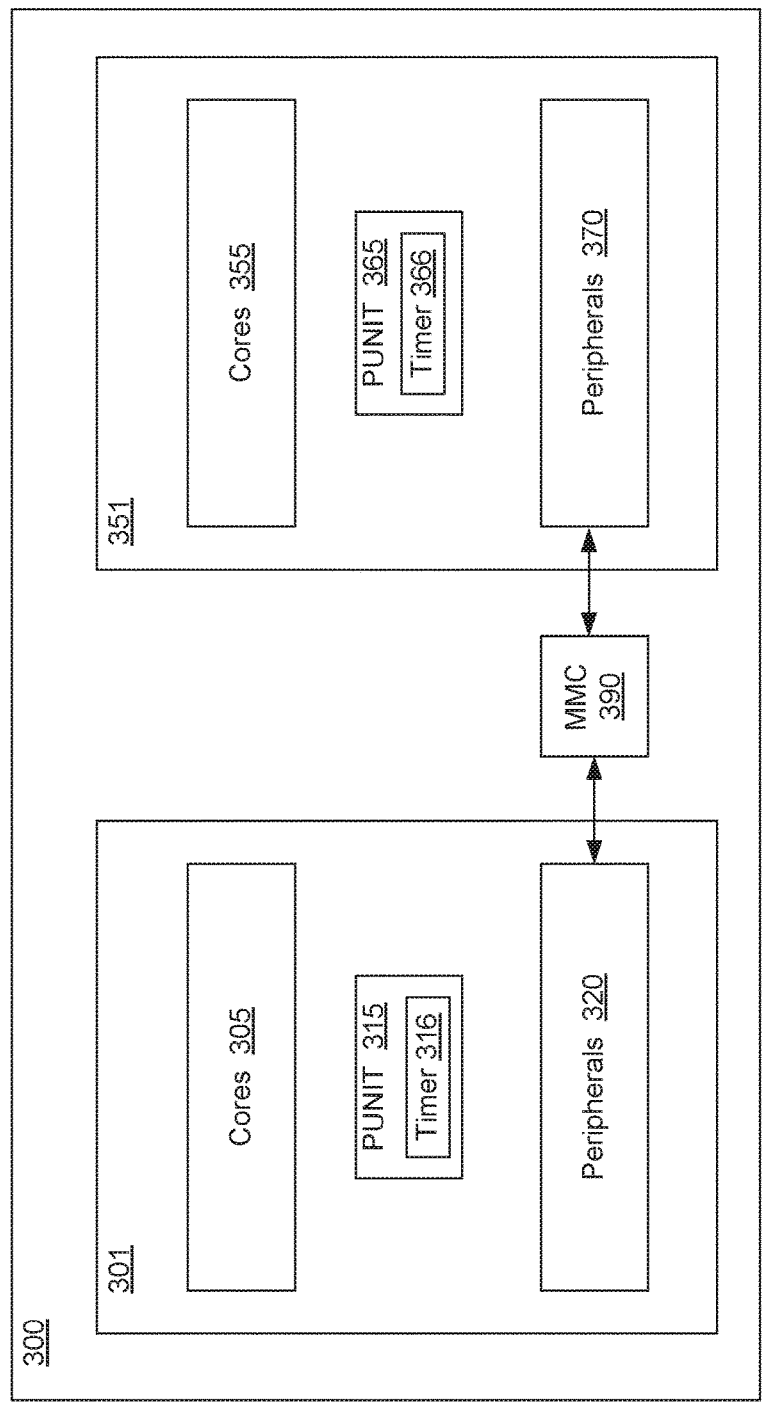
FIG. 3 is a block diagram that illustrates an example of a micro module, in accordance with some embodiments.

Turning to FIG. 3, a block diagram that illustrates an example of a micro module is shown, in accordance with some embodiments. The micro module 300 may include two sockets 301 and 351 connected with one another by a micro module management controller (MMC) 390. The MMC 390 may be coupled with the socket (or server) 301 via an SMB of the socket 301. The MMC 390 may also be coupled with the socket (or server) 351 via an SMB bus of the socket 351. The MMC 390 may be configured to manage the sockets 301 and 351. Internally, the sockets 301 and 351 may be configured similarly to the socket 200 (shown in FIG. 2). For example, the socket 301 may include the cores 305, the PUNIT 315 and the peripherals 320. The socket 351 may include the cores 355, the PUNIT 365 and the peripherals 370.

It may be noted that when the utilization of the cores 305 or 355 is high (e.g., over 50%), the corresponding PUNIT 315 or 365 may keep the cores in the normal power consumption state (e.g., MC0 state) and not put the cores in the low power consumption state (e.g., MC4 state). However, when the utilization of the cores is low (e.g., less than 30%), the PUNIT 315 or 365 may put the cores 305 or 355 into the low power consumption state (e.g., MC0 state to MC4 state, and then lower by transitioning from MC4 state to MC6 state). The PUNITs 315 and 365 may operate independently of one another. Each of the PUNITs 315 and 365 may include a timer 316 and 366 respectively. The timers 316 and 366 may be used to determine how long the cores 305 and 365 may stay in the low power consumption state (e.g., MC6 state). It may be possible for the cores 305 to be placed in the lower power consumption state (e.g., MC6 state), while the cores 355 may remain in the normal power consumption state (e.g., MC0 state) or vice versa.

Figure 4:
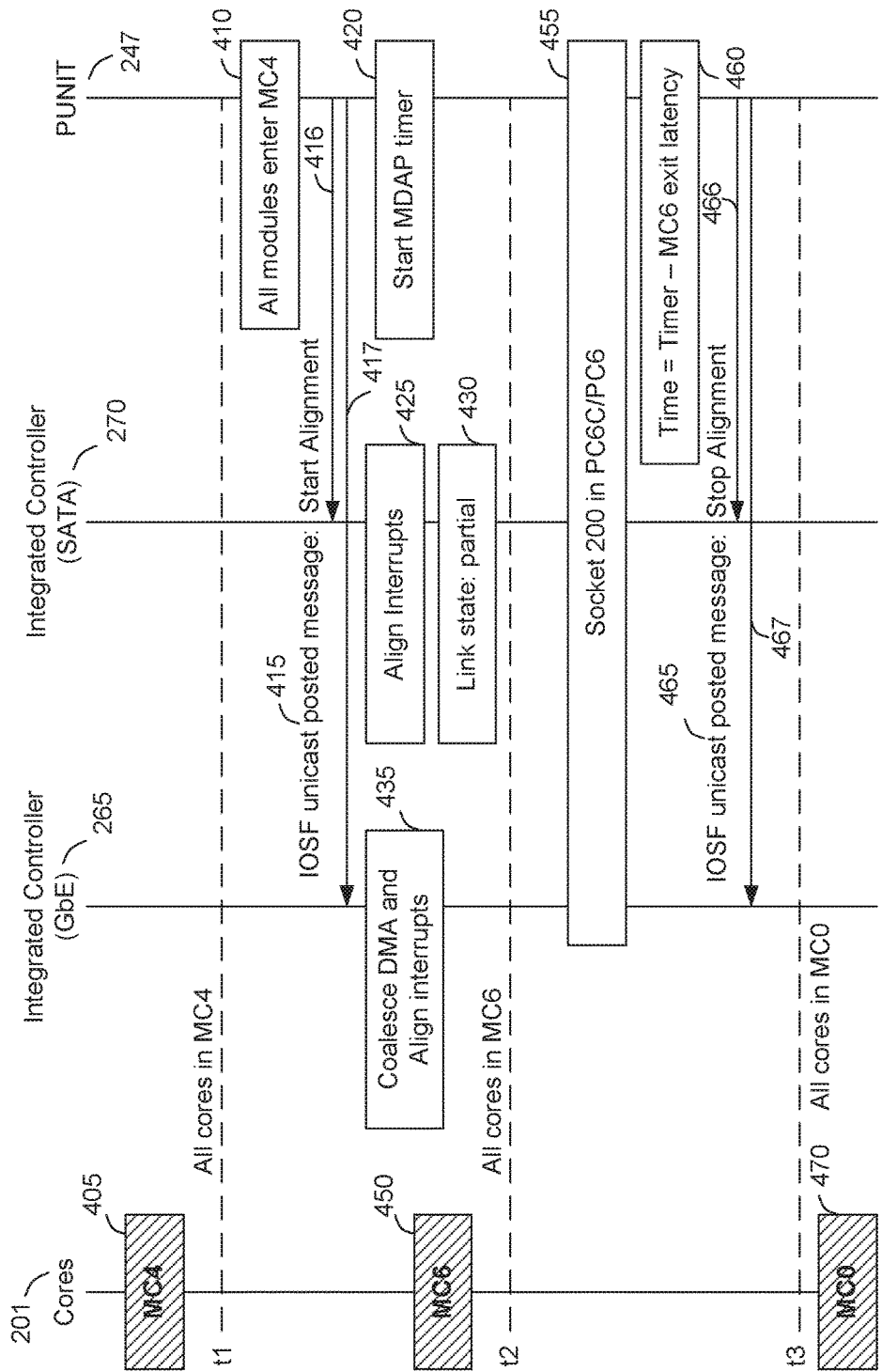
FIG. 4 is a diagram that illustrates an example sequence of operations that may be performed by various components of a socket to reduce power consumption, in accordance with some embodiments.

Turning to FIG. 4, a diagram showing an example sequence of operations that may be performed by various components of a socket to reduce the power consumption, in accordance with some embodiments. In this example, the components may correspond to the components of the socket 200 (shown in FIG. 2), and each component is listed in a column as the cores 201, the GbE controller 265, the SATA controller 270, and the PUNIT 247. Each column may include operations to be performed by the component or a status of the component at a certain time. The diagram 400 may progress from top to bottom according to a timeline.

Although not shown, the cores 201 may initially be operating in the normal power consumption state (e.g., MC0 state). When the utilization of the cores 201 becomes low (e.g., less than 30%), the cores 201 may be placed in the low power consumption state (e.g., MC4) 405 at approximately time "t1". The placing of the cores 201 into the low power consumption state may be performed by the PUNIT 247, as shown in block 410. The PUNIT 247 may notify the SATA controller 270 and the GbE controller 265 via messages 416 and 417 that it may be necessary for the SATA controller 270 and the GbE controller 265 to let the cores 201 stay in the low power consumption state. The notification may be via a unicast message 415. The PUNIT 247 may start a timer 420. The time period may be set based on a maximum direct memory access (DMA) alignment period. The timer may therefore be referred to as an MDAP timer. The MDAP timer may be included in the PUNIT 247. The time period may enable the cores 201 to stay in an idle mode for a longest time possible. The MDAP timer may be pre-programmed to a default value based on the MC6 state latency time (e.g., 500 micro seconds or ten times MC6 exit latency). Selecting the right time period may depend on a balance between a latency factor and a power consumption factor. For example, if the time period is set for an extended period, the cores may remain in the MC6 state for a long time while the processing of the transactions may experience unnecessary delay.

Upon receiving the notification, the GbE controller 265 and the SATA controller 270 may stop performing operations that may need the attention of the cores 201. This may include aligning the operations of the GbE controller 265 and the SATA controller 270 to accommodate the cores 201 transitioning into the lower power consumption state. For example, there may be alignment of any possible interrupts 425 by the GbE controller 265 (e.g., due to receipt of packet) 265 and any possible DMA activities 435 by the SATA controller 270 (e.g., due to data read from hard disk device). During this time, the SATA controller 270 may be considered to be in a partial link state 430 because it may not be fully communicating with the DMA controller. Buffering may be used to prevent loss of data while the cores 201 are in the low power consumption state.

The PUNIT 247 may then place the cores 201 into the lower power consumption state (e.g., MC6 state). This may occur at approximately time "t2". The cores 201 may stay in the lower power consumption state while the MDAP timer is running. For some embodiments, while the cores 201 remain in the lower power consumption state, other components of the socket 200 may also be placed in a low power consumption state, as shown in block 455. The amount of time that the cores 201 may remain in the lower power consumption state (e.g., MC6 state) may equal to the time set by the MDAP timer and the latency time for the cores 201 to transition from the lower power consumption state (e.g., MC6 state) to the normal power consumption state (e.g., MC0), as shown in block 460.

When the time period associated with the MDAP timer expires, the PUNIT 247 may notify the SATA controller 270 and the GbE controller 265 via side band messages 466 and 477. The SATA controller 270 and the GbE controller 265 may then resume processing their information because the cores 201 may return to the normal power consumption state. The notification may be via a unicast message 465, which may occur at approximately time "t3".

For some embodiments, the time period set with the MDAP timer may be programmable. For example, a user may set the time using a software interface that may be associated with the cores 201. The time period may also be set by the original equipment manufacturer (OEM) of the socket 200. For some embodiments, the time period may be overridden when it is no longer possible to wait for the cores 201 to exit the lower power consumption state. For example, when the GbE controller 265 is close to exhausting its buffer space and the risk of losing packets received from the network is high, an interrupt may be generated to awaken the cores 201.

Figure 5:
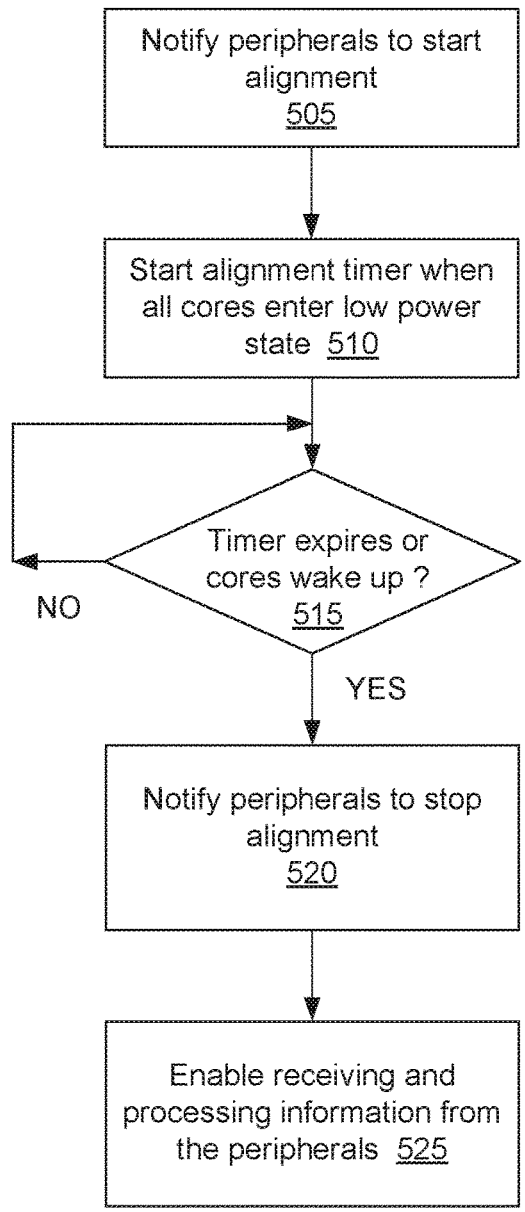
FIG. 5 is a flowchart of an example method that may be performed by a power management unit of a socket, in accordance with some embodiments.

Turning to FIG. 5, an example flow diagram illustrating a process that may be performed by a PUNIT, in accordance with some embodiments. The process may correspond to the PUNIT 247 managing the power consumption of the cores 241. The cores 241 may already be in a low power consumption state (e.g., MC4 state). At block 505, the PUNIT may notify the peripheral devices to start alignment which may include delaying their operations. For example, the delay may be in the form of buffering instead of processing the data received from the network by the GbE controller or received from a hard disk drive by the SATA controller. The delay may include aligning the interrupts instead of processing each interrupt as it occurs.

The PUNIT may start an alignment timer and may send IOSF side band messages to the GbE and the SATA controllers to start alignment, as shown in block 510. The GbE and the SATA controllers may gather the DMA and align interrupts upon receiving the IOSF start alignment message.

At block 515, a test may be performed to determine whether the timer has expired. When the timer has not expired, the process may continue to wait at block 515. However, when the timer expires, the process may proceed to block 520 where the PUNIT may send IOSF side band messages to the GbE and the SATA controllers to stop the alignment of the interrupts and/or the buffering of the data. At block 525, upon receiving the stop message, the GBE and the SATA controllers may enter the normal operation mode. At low utilization, whenever all of the cores enter the MC4 state, even for a short duration (e.g., 1 micro second), the techniques described herein may force the socket to enter the lower power state (e.g., MC6 state) and stay there for a long period of time. This may improve the average platform power savings at low utilization.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to integrated circuit (IC) chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. might be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

I claim:

1. A computer-implemented method comprising:
    using side band communication, causing one or more peripherals of a server having multiple cores to delay operations based on determining that the cores are being placed into a first power consumption state;
    placing the cores into a second power consumption state during a time period, the second power consumption state consuming less power than the first power consumption state;
    using the side band communication, causing the one or more peripherals to resume operations based on an expiration of the time period; and
    placing the cores into a third power consumption state based on the expiration of the time period and based on receiving an indication that the one or more peripherals are unable to continue to delay their operations before the expiration of the time period, the third power consumption state consuming more power than the first power consumption state and the second power consumption state;
    wherein the time period starts in response to the cores being placed into the first power consumption state;
    wherein the time period is set based on a maximum direct memory access alignment period;
    wherein the second power consumption state is a sleep-type power consumption state.

2. The method of claim 1, wherein the cores are associated with a first socket of a micro server having the first socket and a second socket.

3. The method of claim 2, wherein power consumption of cores associated with the second socket is configured independently of power consumption of the cores associated with the first socket.

4. The method of claim 1, wherein the sideband communications are conducted with a Gigabit Ethernet controller.

5. The method of claim 4, wherein the Gigabit Ethernet controller delays operations by aligning interrupts.

6. The method of claim 1, wherein the sideband communications are conducted with a Serial Advanced Technology Attachment (SATA) controller.

7. The method of claim 6, wherein the SATA controller delays operations by buffering data.

8. A system comprising:
    multiple cores;
    a power management unit coupled to the cores; and
    one or more peripherals coupled to the power management unit, wherein the power management unit is to:
        cause the one or more peripherals to delay operations based on determining that the cores are in a first power consumption state;
        place the cores in a second power consumption state during a time period, the second power consumption state consuming less power than the first power consumption state;
        cause the one or more peripherals to resume their operations based on expiration of the time period; and
        place the cores in a third power consumption state based on the expiration of the time period and based on receiving an indication that the one or more peripherals are unable to continue to delay their operations before the expiration of the time period, the third power consumption state consuming more power than the first power consumption state and the second power consumption state;
        wherein the time period starts in response to the cores being placed into the first power consumption state;
        wherein the time period is set based on a maximum direct memory access alignment period;
        wherein the second power consumption state is a sleep-type power consumption state.

9. The system of claim 8, wherein the power management unit is to communicate with the one or more peripherals using side band communications.

10. The system of claim 8, wherein the one or more peripherals include a Gigabit Ethernet controller, and wherein the Gigabit Ethernet controller is to delay operations by aligning interrupts.

11. The system of claim 8, wherein the one or more peripherals include a Serial Advanced Technology Attachment (SATA) controller, and wherein the SATA controller is to delay operations by buffering data.

12. The system of claim 8, wherein the cores are associated with a first socket of a micro server module having the first socket and a second socket.

13. The system of claim 12, wherein power consumption of cores associated with the second socket is to be configured independently of power consumption of the cores associated with the first socket.

14. The system of claim 13, wherein the first socket includes the cores and other socket components, and wherein power consumption of one or more of the other socket components of the first socket is to be reduced based on the cores being placed in the second power consumption state.

15. The system of claim 8, wherein the time period is to be programmable.

16. A non-transitory computer readable storage medium comprising a set of instruction which, when executed by a processor, cause a computer to:

using side band communication, cause one or more peripherals of a server having multiple cores to delay operations based on determining that the cores are being placed into a first power consumption state;

place the cores into a second power consumption state during a time period, the second power consumption state consuming less power than the first power consumption state;

using the side band communication, cause the one or more peripherals to resume operations based on an expiration of the time period; and place the cores into a third power consumption state based on the expiration of the time period and based on receiving an indication that the one or more peripherals are unable to continue to delay their operations before the expiration of the time period, the third power consumption state consuming more power than the first power consumption state and the second power consumption state;

wherein the time period starts in response to the cores being placed into the first power consumption state;

wherein the time period is set based on a maximum direct memory access alignment period;

wherein the second power consumption state is a sleep-type power consumption state.

17. The medium of claim 16, wherein the cores are to be associated with a first socket of a micro server having the first socket and a second socket.

18. The medium of claim 17, wherein power consumption of cores associated with the second socket is to be configured independently of power consumption of the cores associated with the first socket.

* * * * *